United States Patent [19]

Sonoda

[11] 4,274,482
[45] Jun. 23, 1981

[54] LAMINATED EVAPORATOR

[75] Inventor: Noriaki Sonoda, Sagamihara, Japan

[73] Assignee: Nihon Radiator Co., Ltd., Tokyo, Japan

[21] Appl. No.: 935,460

[22] Filed: Aug. 21, 1978

[51] Int. Cl.³ .............................. F28F 9/16; F28F 9/22
[52] U.S. Cl. ...................................... 165/153; 62/525; 165/166; 165/176
[58] Field of Search ............... 165/130, 153, 166, 174, 165/167, 175, 176, 152; 62/504, 525

[56] References Cited

U.S. PATENT DOCUMENTS

| | | | |
|---|---|---|---|
| 2,028,213 | 1/1936 | Hemphill | 165/174 X |
| 2,099,186 | 11/1937 | Anderegg | 165/174 X |
| 3,234,755 | 2/1966 | Richelli | 62/525 |
| 3,976,128 | 8/1976 | Patel et al. | 165/153 |
| 4,081,025 | 3/1978 | Donaldson | 165/153 X |

FOREIGN PATENT DOCUMENTS

| | | | |
|---|---|---|---|
| 2245091 | 4/1974 | Fed. Rep. of Germany | 165/153 |
| 1051601 | 12/1966 | United Kingdom | 165/153 |
| 1304691 | 1/1973 | United Kingdom | 165/153 |

Primary Examiner—Stephen Marcus
Attorney, Agent, or Firm—Gordon W. Hueschen

[57] ABSTRACT

The disclosure relates to a heat exchanger-type laminated evaporator, in which a plurality of liquid passage pipe units are arranged in side-by-side relation to form flat liquid passage pipes which communicate at their ends, with enlarged portions forming reservoirs, each of which communicates through a perforation in the wall thereof with an adjacent liquid reservoir, thereby forming an inlet manifold and an outlet manifold and intermediate manifolds. Adjacent manifolds are separated from each other by a common imperforate wall and the imperforate walls at one end are staggered relative to those at the other end, so that refrigerant introduced into the inlet manifold flows through a set of the flat liquid passage in one direction and then through an adjacent set of flat liquid passage pipes in the other direction, and so on, until the outlet manifold is reached. The liquid passage pipe units are made of mirror-image stampings fastened rim-to-rim to form the flat liquid passage pipes and the reservoirs at the ends thereof.

13 Claims, 5 Drawing Figures

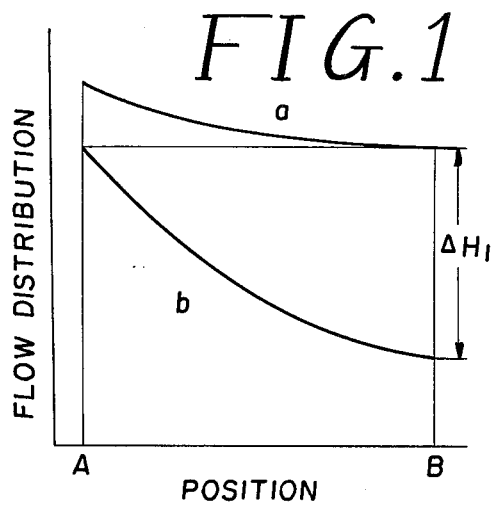
FIG.1
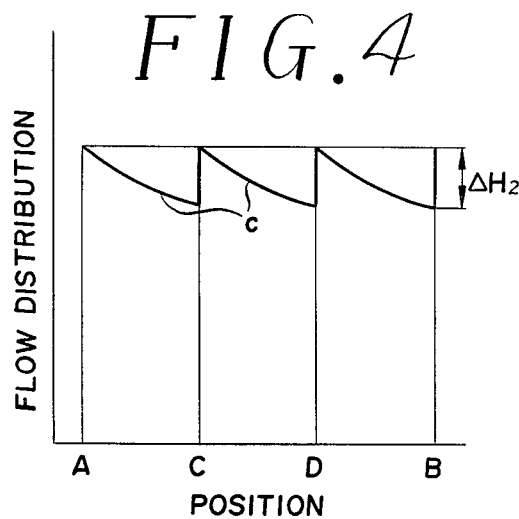
FIG.4
FIG.3
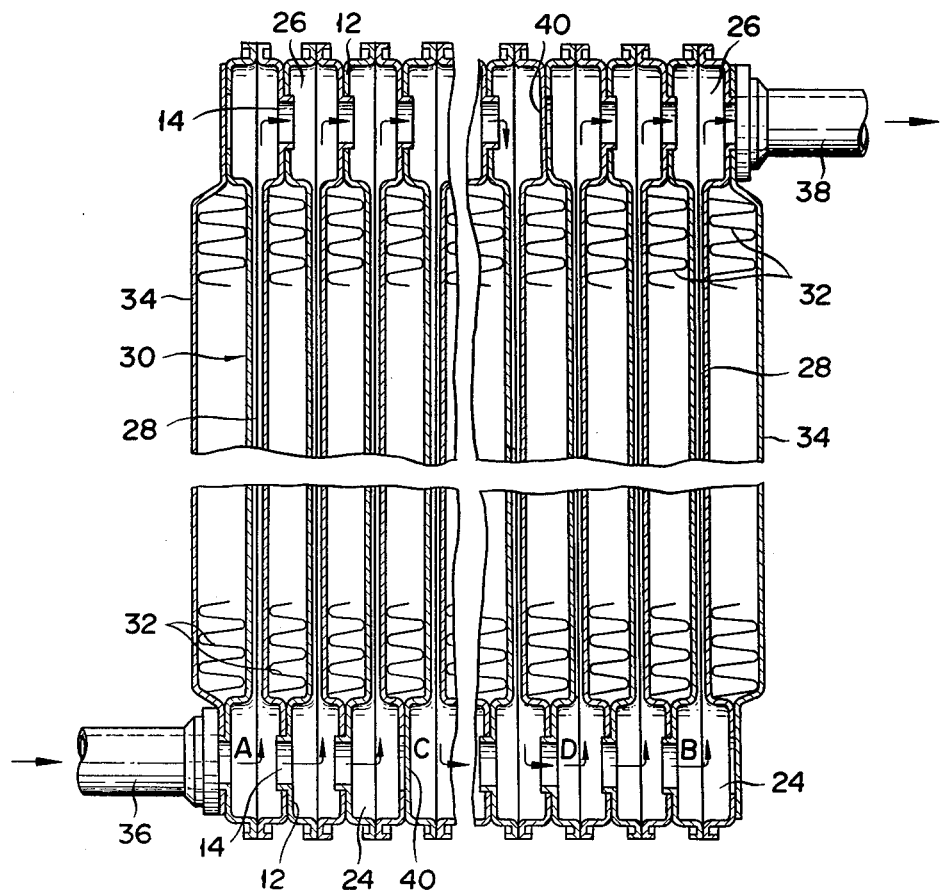

LAMINATED EVAPORATOR

BACKGROUND OF THE INVENTION

1. Field of the Invention

This invention relates to a laminated evaporator, and more particularly it relates to a heat exchanger-type laminated evaporator used in an air conditioner of an automobile or like vehicle.

2. Description of the Prior Art

A heat exchange-type evaporator to be used in an air conditioner of a vehicle such as an automobile, according to the prior art, for example, British Pat. Nos. 1,304,691 and 1,051,601, is made of integral metal plates having deep recessed parts at both ends in communication with each other by shallow recessed grooves. Two such plates are laminated with the recesses facing each other to make a single flat pipe communicating with compartments formed by the deep recesses at each of the upper and lower ends. A plurality of such single pipes are arranged in side-by-side relation. Several such laminates are stacked with the outer surfaces of each recess juxtaposed to the outer surface of a recess of an adjacent laminate and all the juxtaposed surfaces are punched to communicate with each other, thereby forming the compartments into tanks at the upper and lower ends of the single pipe with the flat pipes of one laminate opposed to and spaced from the flat pipes of an adjacent laminate. Corrugated fins are held between the opposed flat pipes to form a core part therein. Outlet and inlet pipes are connected, respectively, to the upper and lower tanks. In such an evaporator, refrigerant which has been fed from the inlet pipe to the lower tank is passed through the flat pipes into the upper tank and is evaporated therein by heat exchange with air fed through the corrugated fins and the air passing through the fins is cooled by the latent heat of vaporization of the refrigerant.

However, in such a laminated type evaporator, when a large volume of refrigerant is fed into the lower tank, a distribution of the refrigerant into each of the flat pipes is relatively uniform and, to the contrary, when a rate of flow of the refrigerant is decreased, the distribution of the refrigerant into each of the flat pipes becomes non-uniform and the performance of the evaporator is decreased. For example, in such an evaporator, the distribution of the refrigerant from a position A nearest to the inlet pipe to a position B farther therefrom is sufficiently uniform at a high rate of inflow, as shown in curve a of FIG. 1, but at a low rate of flow, it is not. Thus, at a low rate of flow, there is a larger difference, $\Delta H_1$, in the distribution between the position A and the position B, as shown in curve b, which causes a deterioration in the performance.

In order to eliminate such defects, in accordance with U.S. Pat. No. 3,976,128 of C. N. Patel et al., a tube having orifices punched at a certain angle against the air inlet side of the evaporator is inserted into the lower tank, and the tube is connected with the inlet pipe. However, it is difficult to provide a correct installation of the tube having such structure as described above. When a rate of flow of refrigerant is low, even if the tube has such structure as described above, a good distribution of the refrigerant is not adequately obtained.

OBJECTS OF THE INVENTION

Accordingly, it is an object of the present invention to provide an improved evaporator having a simple structure and a superior performance.

It is another object of the present invention to provide an improved heat exchanger-type laminated evaporator having good distribution even if a rate of flow of refrigerant is low.

It is still another object of the present invention to provide a laminated evaporator to be used in an air conditioner and the like of a vehicle.

BRIEF DESCRIPTION OF THE INVENTION

These and other objects of the present invention are accomplished by a heat exchanger-type laminated evaporator of the class in which a plurality of liquid passage pipe units are arranged in side-by-side relation to form flat liquid passage pipes which communicate at their ends with enlarged portions forming reservoirs at each end, each of which communicates through a perforation in the wall thereof with an adjacent reservoir, thereby forming an inlet manifold which communicates with an inlet means and an outlet manifold which communicates with an outlet means, and is particularly directed to the improvement wherein the inlet manifold is divided into non-communicating chambers, one of which, the inlet chamber, communicates with the inlet means and another of which, a non-inlet chamber, does not; and wherein the outlet manifold is divided into non-communicating chambers, one of which, the outlet chamber, communicates with the outlet means and another of which, a non-outlet chamber, does not; the chambers of the inlet manifold being staggered relative to the chambers of the outlet manifold so that, refrigerant introduced through the inlet means flows through a set of the flat liquid passage pipes into a non-outlet chamber of the outlet manifold and back through an adjacent set of the flat liquid passage pipes into a non-inlet chamber of the inlet manifold, from a non-outlet chamber through another set of flat liquid passage pipes into the outlet chamber of the outlet manifold, and then out through the outlet means.

Advantageously, the inlet means is arranged so that it directly communicates with the inlet manifold and the outlet means is arranged so that it directly communicates with the outlet manifold.

It is sometimes of advantage, however, to have the outlet means arranged so that it directly communicates with the outlet manifold and the inlet means is a pipe arranged so that it passes from the same side as the outlet means through the non-inlet chamber of the inlet manifold into the inlet chamber of the inlet manifold, or to have the inlet means arranged so that it directly communicates with the inlet manifold and the outlet means is a pipe arranged so that it passes from the same side as the inlet means through the non-outlet chamber of the outlet manifold into to the outlet chamber of the outlet manifold. In such cases, where an inlet or outlet pipe is passed through several reservoirs, it is desirable to have the perforations in the walls of the reservoirs, except the first and the last, larger in diameter than the pipe in order to provide space for the passage of liquid from one reservoir into the next adjacent reservoir, or to have additional perforations for this purpose.

BRIEF DESCRIPTION OF THE DRAWINGS

In the drawings:

FIG. 1 is a graph showing a distribution of the refrigerant across the inlet manifold of a conventional evaporator;

FIG. 3 is side elevational view in cross-section of one embodiment of the evaporator of the present invention;

FIG. 4 is a graph showing a distribution of the refrigerant at an inlet manifold of an evaporator of the present invention; and, FIG. 5 is a side elevational view in cross-section of another embodiment of the evaporator of the present invention.

DETAILED DESCRIPTION OF THE INVENTION

Figure 2:
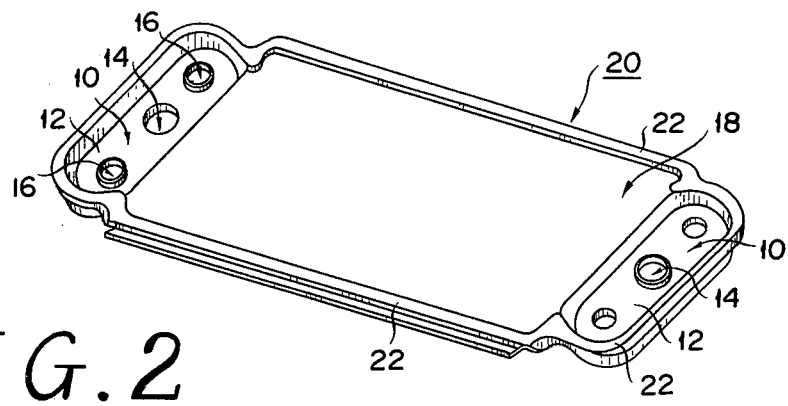
FIG. 2 is an isometric view showing an element of an evaporator of the present invention.

Referring now to the drawings, a preferred embodiment of the evaporator of the present invention will be described.

As shown in FIGS. 2 and 3, a flat sheet of metal piece 20, of aluminum or the like, is formed with a shallow depression 18 in the central portion thereof, and relatively deep depressions 10 at each end, and a continuous flat rim 22 such that, when two of the pieces 20 are placed face to face with their respective rims juxtaposed, they form a passage pipe unit, as shown, for example, at 30, in which the depressions 10 form a reservoir 24 at the upper end and a like reservoir 26 at the lower end, which are connected by a flat liquid pipe 28 formed by the shallow depressions 18.

A plurality of such liquid passage pipe units 30 are connected with each other in side-by-side relation and the bottom walls 12 of the depressions 10, which have flat outer faces in juxtaposition, are affixed to each other by means of brazing, adhesives, etc. Between each of the flat liquid pipes 28 of the liquid passage pipe units 30 is held a corrugated fin 32 and in particular a corrugated fin 32 having louvers formed therein. At the outermost part of the liquid passage pipe units 30 are affixed the end plates 34, if desired, and also between each end end plate 34 and the flat liquid passage pipe 28, there is a corrugated fin 32. In this way, a core part of the evaporator is formed with the reservoirs 24 and 26 at both ends. These liquid reservoirs 24 and 26 are connected with an inlet pipe 36 and an outlet pipe 38. Within the flat liquid passage pipe 28 may be inserted an inner fin, not shown.

The outer wall of reservoir 24 is in liquid communication with inlet pipe 36 and at least the first of the juxtaposed walls 12 of reservoir 24 has perforations 14 for the passage of liquid into the reservoir of the next adjacent passage pipe unit, and so on. However, at least one of the juxtaposed walls 12 is not so perforated in order to provide a blind wall or partition, as shown at 40, between adjacent reservoirs. There is thus provided a manifold or header communicating with the flat liquid passage pipes 28, which is divided into at least two chambers, one of which will be referred to as the inlet chamber because it is connected with the inlet pipe 36, and the others as the non-inlet chambers, because they are separated from the inlet pipe by the blind wall or partition 40.

In like manner, the outer wall of a reservoir is in fluid communication with outlet pipe 38 diagonally across the evaporator from the inlet pipe 36. At least the last of the juxtaposed walls 12 in the upper reservoir has a perforation 14 therein for the passage of liquid from the next adjacent reservoir, and so on. However, at least one of the juxtaposed walls 12 is not perforated in order to provide a blind wall or partition, as shown at 40, in the upper manifold. The blind walls 40 in the upper manifold are staggered with respect to the ones in the lower manifold, the ones in the latter being closer to the inlet side of the evaporator than to the outlet side thereof, and the ones in the upper manifold being closer to the outlet side of the evaporator than to the inlet side thereof.

Thus, the evaporator constructed as described above has upper and lower manifolds composed of juxtaposed liquid reservoirs 26 and 24, respectively, which manifolds are divided by partition walls 40 into non-communicating chambers, one of which, the inlet chamber, communicates with the inlet pipe 36, and another of which, the outlet chamber, communicates with outlet pipe 38. Thus, the refrigerant which flows into the inlet chamber is constrained by the lower partition 40 to flow up within the flat liquid passage pipes 28, as indicated by arrows at A, in heat exchange with the air fed through the fins 32. The refrigerant thus heated finally reaches the non-outlet chamber of the upper manifold where it is constrained by the upper partition wall 40 to flow down the flat liquid passage pipes 28 on the outlet side of the lower partition 40 to the non-inlet chamber of the lower manifold, further raising its temperature. The refrigerant then flows over to the reservoirs at D and B and from there up sets of flat liquid passage pipes 28 into the outlet chamber of the upper manifold on the downstream side of the upper partition 40. During this passage, the refrigerant is evaporated under the heat exchange and the gas formed discharged through outlet pipe 38 to a compressor, not shown.

Since, in the evaporator in accordance with the present invention, the cross-sectional area occupied by the refrigerant in its flow from the inlet manifold to the outlet manifold is small, as compared with that in conventional ones, there is a smaller difference between the distribution of the refrigerant at both ends of the inlet manifold. Measurement of the refrigerant at each of the positions A, C, D and B of the evaporator shown in FIG. 3 gives a curve c, shown in FIG. 4, having an $\Delta H_2$, which is small, as compared with the $\Delta H_1$ of curve b.

Figure 5:
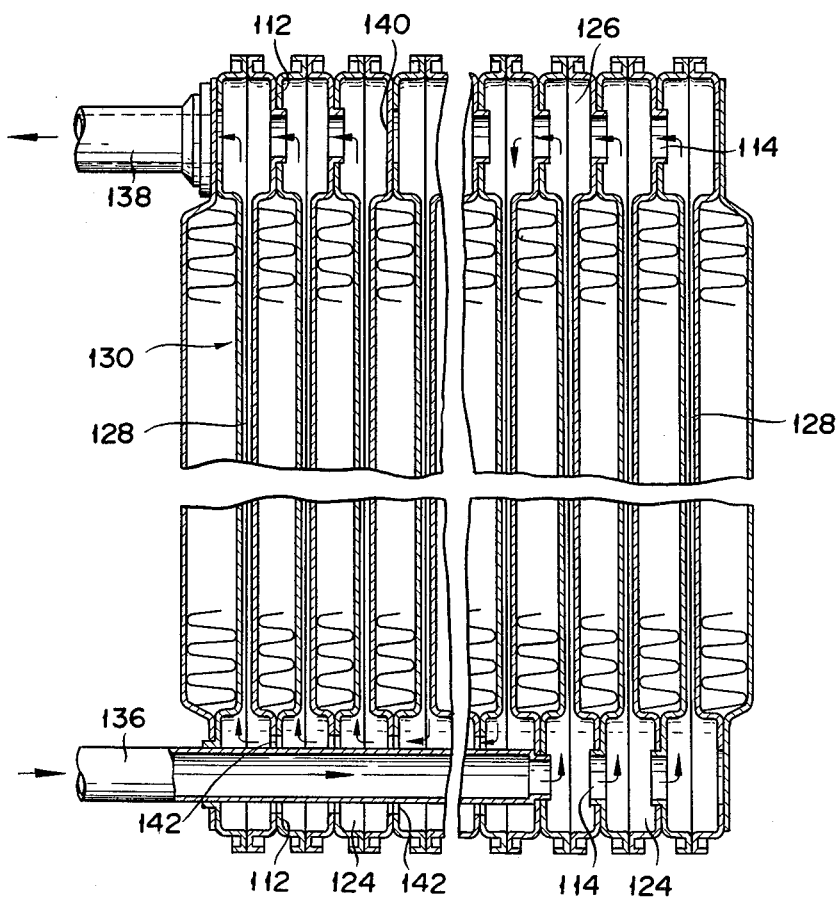

FIG. 5 shows another embodiment of the evaporator of the present invention in which the inlet pipe 136 and the outlet pipe 138 are affixed at the same side. This evaporator has substantially the same structure as that of FIG. 3, in that at least one of the juxtaposed walls 112 is imperforate, thus forming a blind partition wall 140 in the upper manifold of FIG. 5, thereby dividing the upper liquid reservoir into two chambers. To the juxtaposed walls 112 forming the blind partition wall of the lower manifold, is connected the inlet pipe 136 by extending the same, thereby dividing it into two chambers through the perforations 114 in the juxtaposed walls 112 of the lower liquid reservoir 124. The lower manifold is thus divided into two chambers, the first one feeding refrigerant up through the flat liquid passage pipes 128 to the upper manifold where, because of the blind partition 140, it is constrained to flow down into the lower manifold and back, as in the first-described modification. If necessary, the diameter of the perforation through which the inlet pipe 136 passes may be made larger than the outer diameter of the inlet pipe in order to form a space 142 through which the refrigerant may pass. However, as shown in FIG. 2, in case a plurality of perforations are provided in the piece, as shown at 16, such space 142 is not necessary and, in place of this arrangement, the bottom wall 112 and the inlet pipe 136 may be affixed to each other.

The evaporator constructed in such a manner as described above has a plurality of chambers in the upper and lower manifolds formed by the blind partition walls and thus the refrigerant flowing from the inlet pipe 136 into the lower manifold is heated in passing up the flat liquid passage pipes 128, as indicated by arrows, by heat exchanged with the air fed to the core and finally reaches to the upper manifold where it is constrained by the upper blind partition wall 140 to flow down the flat liquid passage pipes 128, to the lower manifold where it passes through the spaces 142, or other penetrating holes, not shown, and up again in the liquid passage pipes 128 to the upper reservoir 126. While the refrigerant is raised and lowered, the refrigerant is evaporated by heat exchange and then discharged out the outlet pipe 138.

Having described an embodiment in reference to FIG. 5, in which the inlet pipe 136 is inserted into the lower manifold and the outlet pipe not so inserted, it is to be understood that the reverse may be true. That is, the unit can be inverted, in which case the pipe 138 becomes the inlet pipe and the pipe 136 becomes the outlet pipe. Further, of course, it may be constructed in such a manner that the upper and lower manifolds are arranged at both sides, i.e., right and left sides, with the liquid passage pipes 128 in horizontal orientation. The passage of the refrigerant is not restricted to three passages and it may be changed to provide more than four passages on the basis of the number of liquid passage pipe units 30 or 130.

The liquid passage pipe units of the invention are constructed and assembled and the fins are constructed or held in the same manner as that of the prior art. This assembling operation is quite simple and, irrespective of this fact, it is possible to provide an evaporator having less decrease in efficiency at low rates of flow of the coolant. The evaporator having the inlet and outlet tubes in the same side, as shown in FIG. 5, has the advantage that it is very easy to arrange pipes between the evaporator and other appliances and increases the ease of modification of the piping and design and greatly eliminates wasted space. Further, as the inlet pipe is affixed at its free end to a passage pipe unit and also to the outermost passage pipe unit through which it passes, it adds strength and increased durability through resistance to vibration.

It is to be understood that the invention is not to be limited to the exact details of operation or structure shown and described, as obvious modifications and equivalents will be apparent to one skilled in the art.

What is claimed is:

1. A heat exchanger type laminated evaporator, which comprises a plurality of sets of complementary liquid passage pipe units arranged side-by-side to form flat liquid passage pipes which are formed by complementary shallow, flat portions of said units and reservoirs at each end thereof formed by complementary bulges at both ends of said flat portions, which reservoirs communicate with each other through penetrating holes in common, contiguous walls forming manifolds for the sets of said liquid passage pipes, wherein adjacent said manifolds are separated by a contiguous wall having no penetrating hole therein, and wherein the imperforate, contiguous wall between adjacent manifolds at one end of said liquid passage pipes is staggered in relation to the imperforate, contiguous wall between adjacent manifolds at the other end thereof, whereby liquid is constrained to flow in one direction from an inlet manifold through a set of said liquid passage pipes and then in the opposite direction through an adjacent set of liquid passage pipes and so on, until the outlet manifold is reached; and inlet means for introducing liquid into said inlet manifold; and outlet means for conducting liquid out of said outlet manifold.

2. An evaporator according to claim 1, wherein the inlet means is arranged so that it directly communicates with said inlet manifold through the outer wall of the outer reservoir thereof.

3. An evaporator according to claim 2, wherein the outlet means is arranged so that it directly communicates with said outlet manifold through the outer wall of the outer reservoir thereof.

4. An evaporator according to claim 2, wherein the outlet means comprises a pipe arranged so that it passes from the same side as said inlet means through a non-outlet manifold into said outlet manifold.

5. An evaporator according to claim 1, wherein the outlet means is arranged so that it directly communicates with said outlet manifold through the outer wall of the outer reservoir thereof.

6. An evaporator according to claim 5, wherein the inlet means comprises a pipe arranged so that it passes from the same side as said outlet means through a manifold other than said outlet manifold and into said inlet manifold.

7. An evaporator according to claim 1, wherein the inlet means comprises a pipe arranged so that it passes from the same side as said outlet means through a manifold other than said inlet manifold and into said inlet manifold.

8. An evaporator according to claim 7, wherein said pipe passes through and is spaced from said penetrating holes to provide communication between the reservoirs through which said pipe passes.

9. An evaporator according to claim 8, wherein further penetrating holes are provided in the walls between said reservoirs through which said inlet pipe passes to provide communication between them.

10. An evaporator according to claim 1, wherein the outlet means comprises a pipe arranged so that it passes from the same side as said inlet means through a manifold other than said outlet manifold into said outlet manifold.

11. An evaporator according to claim 10, wherein said pipe passes through and is spaced from said penetrating holes to provide communication between the reservoirs through which said pipe passes.

12. An evaporator according to claim 11, wherein further penetrating holes are provided in the walls between said reservoirs through which said outlet pipe passes to provide communication between them.

13. An evaporator according to claim 1, wherein each liquid passage pipe unit is made of a pair of metal sheets having shallow, flat, central, complementary depressions bridging relatively deep, complementary depressions at the ends thereof and continuous, complementary rims around said depressions, one said plate being affixed to another said plate rim to rim, so that said shallow depressions form said flat liquid passage pipes and said deep depressions form said reservoirs.

* * * * *

UNITED STATES PATENT AND TRADEMARK OFFICE
CERTIFICATE OF CORRECTION

PATENT NO. : 4,274,482
DATED : June 23, 1981
INVENTOR(S) : Noriaki Sonoda

It is certified that error appears in the above—identified patent and that said Letters Patent is hereby corrected as shown below:

Col. 6, line 30; "outlet" should read -- inlet --

Signed and Sealed this

First Day of December 1981

[SEAL]

Attest:

GERALD J. MOSSINGHOFF

Attesting Officer          Commissioner of Patents and Trademarks